(No Model.)

W. C. JOHNSON.
DIE FOR MAKING AUGER BITS.

No. 359,393. Patented Mar. 15, 1887.

Witnesses
J. H. Shumway
Fred C. Earle

Wm. C. Johnson
By Atty.
Inventor
Jno. E. Earle

UNITED STATES PATENT OFFICE.

WILLIAM C. JOHNSON, OF SEYMOUR, CONNECTICUT.

DIE FOR MAKING AUGER-BITS.

SPECIFICATION forming part of Letters Patent No. 359,393, dated March 15, 1887.

Application filed December 20, 1886. Serial No. 222,073. (No model.)

*To all whom it may concern:*

Be it known that I, WILLIAM C. JOHNSON, of Seymour, in the county of New Haven and State of Connecticut, have invented a new Improvement in Dies for Forging Auger-Bits; and I do hereby declare the following, when taken in connection with accompanying drawings and the letters of reference marked thereon, to be a full, clear, and exact description of the same, and which said drawings constitute part of this specification, and represent, in—

Figure 1:
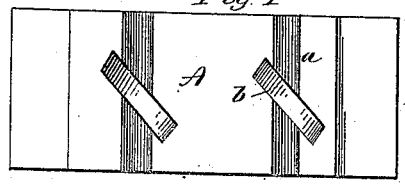
Figure 2:
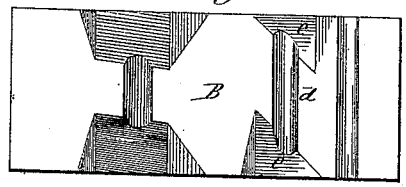
Figure 3:
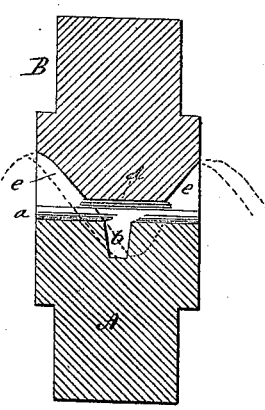
Figure 4:

Figure 1, a top view of the lower die; Fig. 2, an under side view of the upper die; Fig. 3, a vertical section through the two dies set together, the section cutting centrally through the groove in the two parts; Fig. 4, a side view of the bit to be forged.

This invention relates to an improvement in dies for forging that class of auger-bits in which the bit consists of a central spindle having a single blade spirally around it, terminating at its lower end in a single cutter, the spindle terminating in a central screw. A bit of this peculiar construction is shown and described in Patent No. 306,907. In this construction of bit the pitch of the spiral blade is very great, and it has been found difficult to properly shape the spindle and give a uniform pitch to the blade.

The object of my invention is to construct dies in which the spindle and spiral rib may be formed with perfect uniformity.

A represents the lower die, across which is a groove, *a*, of semicircular shape in transverse section, corresponding substantially to the circumference of the spindle. Obliquely across this groove *a* is a recess, *b*, the inclination of the recess to the spindle corresponding to the inclination of the rib on the spindle, and in section through this recess across the spindle it is of semicircular shape, corresponding to the circumference or outer edge of the spiral rib.

B represents the upper or companion die, across which is a groove, *d*, corresponding to the groove *a* in the lower die, and so that the space between the two grooves will correspond to the complete spindle. The length of the groove *d* corresponds to the length of the spindle between the adjacent convolutions of the spiral rib, and at each end of the groove *d* the die is cut away, its surface inclined upward and outward, and curved to form a cheek, *e*, at each end, each corresponding to the shape of the respective sides of adjacent convolutions, and so that when the two dies are closed upon a finished forging one-half of one convolution will stand in the recess *b*, and the rib from that recess at each end follows the corresponding cheek in the part B, and as seen in Fig. 3.

The lower die is fixed in the anvil in the usual manner, and the upper die arranged in the slide or hammer, as the case may be, so as to reciprocate toward and from the other die, the mechanism for such reciprocation not being necessary to the full understanding of this invention. The blank is laid between the two dies, the spiral rib in the cavity in the lower die, and then, the upper die coming down upon the blank in the lower die as a hammer, the operator rotates the blank in the lower die between the blows, and so as to present a new point at each stroke, the twist by such rotation causing the blank to move longitudinally in the direction according to which the blank may be turned. The cheeks *e* coming down between the convolutions brings the grooves directly onto the spindle, and so that while the recess *b* on the lower die, together with the cheeks *e e* on the upper die, give the requisite convolution to the ribs, the grooves in the two dies properly form and shape the spindle and insure its concentric position with relation to the spiral rib.

Preliminary shaping-dies may be employed to prepare the blank for the finishing operation of the dies which I have described, and these preliminary dies are shown at the left in Figs. 1 and 2, and may be made in the same block as the finishing-dies, and are of similar shape, as shown, yet without the same perfection—that is to say, the groove is somewhat larger, the recess also somewhat larger, and the cheeks are less clearly defined. These preliminary dies are employed to "break down" or prepare the blank. The hot rod is introduced between them, and, being struck, forces the metal into the recess and contracts the central portion while the operator rotates the blank between the strokes, the oblique position of the recess giving the requisite advance to the blank to preliminarily form the spiral rib as well as the central spindle. This preliminary operation facilitates the work; yet it may be done entirely in what I have represented as the finishing-dies.

I claim—

The herein-described dies for forging auger-bits, consisting of two parts, A B, the one constructed with a longitudinal groove, *a*, corresponding substantially to one-half the central spindle of the bit, and with a cavity, *b*, obliquely across said groove *a* and corresponding in shape to one-half of a single convolution of the spiral rib, the other part constructed with a groove, *d*, corresponding to the groove *a* in the other part, and the said second part constructed with a cheek, *e*, at each end of said groove corresponding to the adjacent surfaces of said convolutions, substantially as described.

WILLIAM C. JOHNSON.

Witnesses:
WILLIAM E. DOWNS,
HENRY W. STRATTON.